United States Patent Office 3,070,501
Patented Dec. 25, 1962

3,070,501
SUPPRESSION OF AMORPHOUS NOVOBIOCIN CRYSTALLIZATION IN AQUEOUS SUSPENSIONS
John D. Mullins, Lansdale, and Thomas J. Macek, Glenside, Pa., assignors to Merck & Co., Inc., Rahway, N.J., a corporation of New Jersey
No Drawing. Filed Feb. 21, 1957, Ser. No. 641,490
4 Claims. (Cl. 167—65)

This invention relates to novel compositions comprising novobiocin and to the process for preparing them. In particular, the invention relates to stable aqueous suspensions of novobiocin in which the antibiotic is stabilized in its amorphous form.

It has been discovered that amorphous novobiocin is rapidly absorbed from the gastro-intestinal tract after oral administration and that it provides high blood levels of the active antibiotic. Because of this very useful property of amorphous novobiocin, it was considered desirable to prepare an aqueous preparation of this form of the acid which could be administered orally. It was found, however, that when suspensions of amorphous novobiocin in water were prepared the amorphous form re-converted to the crystalline form. As the crystalline form of the antibiotic is substantially inactive therapeutically and as it is not absorbed after oral administration because of its insolubility, it was necessary to find some means to suppress the crystallization of the amorphous form of novobiocin in order that an aqueous suspension could be prepared which would be sufficiently stable and active to be useful commercially.

It was surprisingly found after testing a large number of different compounds that certain specific compounds or mixtures thereof would suppress the crystallization of amorphous novobiocin in an aqueous medium. The compounds which have been found useful for this purpose, and which hereinafter will be referred to as crystallization suppressants, are:

Methyl cellulose,
Cellulose acetate hydrogen phthalate,
Alginic acid salts and derivatives, such as
    An alkali metal alginate, or
    A propylene glycol algin derivative,
Casein, and
Polyvinylpyrrolidone.

Various grades of the above-mentioned crystallization suppressants can be employed. Methyl cellulose, for example, having a viscosity of from 15 to 4,000 cps. (centipoises) can be employed to suppress the crystallization of amorphous novobiocin. As a general rule, the lower the viscosity the more crystallization suppressant is needed and, conversely, the higher the viscosity, the less amount of crystallization suppressant needs to be used to stabilize novobiocin in its amorphous form. For all practical purposes, methyl cellulose having a viscosity of from about 100 to about 1,500 cps. can be used as the volume of crystallization suppressant then can be kept within reasonable limits in preparing aqueous suspensions of amorphous novobiocin.

Similarly, while all of the various grades of polyvinylpyrrolidone ranging in molecular weight from 5,000 to 80,000 or mixtures thereof are suitable for use, a polyvinylpyrrolidone having an average molecular weight of 40,000, known as grade $K_{30}$, is readily available commercially and can be employed to advantage in the aqueous compositions of this invention to suppress the crystallization of amorphous novobiocin.

The alginic acid salts and derivatives are commercially sold in grades ranging from extra low viscosity and low viscosity to high viscosity. All of these grades are suitable for use in the compositions of this invention and have been found to satisfactorily stabilize novobiocin in its amorphous form in an aqueous medium. The propylene glycol derivative of alginic acid sold by Kelco Company, Inc., under the trade designation Kelcoloid LV (low viscosity) and Kelcoloid HV (high viscosity), has been found to be a particularly suitable crystallization suppressant. The alkali metal salts of alginic acid such as sodium alginate sold by Kelco Company, Inc., under the trade designation Kelgin XL (extra low viscosity) and Kelgin LV (low viscosity) also are suitable crystallization suppressants.

Either National Formulary (N.F.) or technical grades of the above crystallization suppressants can be employed.

It has been found that the amount of crystallization suppressant needed to suppress the crystallization of amorphous novobiocin varies from compound to compound and in general, the smallest or the lowest concentration is that which will suppress the crystallization of amorphous novobiocin and the highest concentration is that which will increase the viscosity of the aqueous suspension to a point where it will no longer flow or it becomes too viscous to be suitable for oral administration. A practical concentration which was found to make a suitable stable suspension of amorphous novobiocin ranges between about 0.05 to about 2% of crystallization suppressant to 2½% amorphous novobiocin. Generally, 0.1 to 1% of crystallization suppressant is adequate to maintain 2½% of novobiocin in its amorphous form in an aqueous medium.

If desired, other ingredients can be added to the aqueous suspension containing amorphous novobiocin and its crystallization suppressant. It may be desirable in some instances to add a suspending agent to prevent the amorphous novobiocin from settling out of the aqueous medium. An agent such as magnesium aluminum silicate (sold under the trade designation Veegum by R. T. Vanderbilt Co., Inc.), and sodium carboxymethylcellulose can be used for this purpose. It also is possible to employ one or more of the compounds identified above as crystallization suppressants as a suspending agent. For example, if Kelcoloid HV is employed to suppress the crystallization of amorphous novobiocin, then methyl cellulose or one of the alginic acid compounds can be employed as a suspending agent or a mixture of one or more of these crystallization suppressants can be employed for this purpose. Alternatively, the suspension of amorphous novobiocin can be stabilized by adjusting the density of the vehicle to approximately that of the solid materials suspended therein. This can be accomplished by adding sucrose, sorbitol or other similar agents to the composition in an amount calculated to increase the density of the vehicle to the necessary degree to stabilize the suspension.

Other therapeutic agents also can be added to the composition provided they do not interfere with the stability of amorphous novobiocin in the aqueous medium. In particular, penicillin can be added, and as it is often desirable to administer penicillin together with novobiocin this dosage form is of particular importance. This is so because novobiocin is effective against penicillin-resistant organisms as well as organisms that are killed or whose growth is inhibited by penicillin.

Of course, flavoring oils and other ingredients commonly employed in improving the appearance and/or taste of aqueous preparations designed for oral administration can be incorporated in the compositions of this invention as well as preservatives and the like.

As amorphous novobiocin is an effective antimicrobial agent, the compositions of this invention are useful in treating all the clinical indications known to be alleviated or cured by this antibiotic. Thus, as novobiocin is effective against penicillin-resistant staphylococci as well as against streptococci and pneumococci, and as these organisms are responsible for most bacterial respiratory infections, novobiocin can be used in the treatment of such infections in humans. For this purpose, the aqueous compositions of this invention can be administered orally at a daily dosage level of amorphous novobiocin of from about 1 to 2 grams.

While the oral use of the compositions of this invention is of particular importance, the compositions also are very useful for instillation into body cavities to cure bacterial infections. Thus, they find use in the veterinary field especially in the treatment of mastitis in cows. Compositions comprising 20–100 mgs. of amorphous novobiocin per application unit are suitable for this purpose.

The aqueous compositions of this invention also are useful in the treatment and control of plant diseases. Thus, they can be used in the control of bean blight caused by *Xanthomonas phaseoli*. For this purpose, the plants are sprayed with the aqueous compositions of this invention containing about 100 p.p.m. of amorphous novobiocin. Such sprays may contain various spreading agents and/or other active agents, and can be prepared in accordance with methods well known in the art.

The aqueous compositions of this invention are advantageously prepared by dissolving an alkali metal salt of novobiocin in water, converting the salt to the amorphous acid by the addition of a mineral or organic acid or a combination thereof and then adding the crystallization suppressant. The order in which these steps are carried out depends on the crystallization suppressant used. Methyl cellulose, for example, should be added after precipitation of the free acid whereas the alginic acid compounds should be in solution before the amorphous acid is precipitated.

Any of the mineral or organic acids which are conventionally used in preparing pharmaceutical products and which are not toxic when administered orally can be used to convert the alkali metal salt of novobiocin to the amorphous acid. Acids that are readily available and quite suitable for this purpose are hydrochloric and citric acid although many other examples of acids suitable for converting a salt to the free acid, such as phosphoric, nitric, acetic, tartaric, and the like acids, will readily suggest themselves to those skilled in preparing pharmaceutical compositions for oral administration.

It may be advantageous in some instances in preparing the compositions of this invention to add an alkali to facilitate dissolving the crystallization suppressant. When cellulose acetate hydrogen phthalate, casein or an alginic acid or a derivative of alginic acid is used as a crystallization suppressant for amorphous novobiocin, it is particularly desirable to use an alkali such as sodium hydroxide, potassium hydroxide and the like to ensure rapid and complete dissolution of these agents to stabilize the antibiotic in its amorphous form.

It has also been found advantageous to adjust the final product to pH 3.0 which is the pH at which the amorphous novobiocin is minimally soluble. While the pH can vary to the more acid or more alkaline side of pH 3.0, for all practical purposes this is the pH preferred for the compositions.

It must be understood, of course, that the important feature of the process by which the composition of this invention is prepared, is that a crystallization suppressant be incorporated with novobiocin in an aqueous medium. It is not critical to the inventive concept how the amorphous form of novobiocin is obtained or exactly how the ingredients are put together.

The following examples will illustrate the compositions of this invention and methods suitable for preparing them. It is to be understood, however, that the following examples are merely illustrative and are not to be considered as limiting the invention to the precise conditions and reagents specifically recited as modifications, such as those described above, can be made and are to be considered as falling within the scope of this invention.

EXAMPLE 1

*Amorphous Novobiocin Stabilized With Methyl Cellulose*

|   | Percent |
|---|---|
| Sodium novobiocin | Equivalent to 2.5 free acid. |
| Citric acid, 5% solution | 0.3. |
| Hydrochloric acid, N/1, q.s. | pH 3.0. |
| Methyl cellulose, 1,500 cps. | 1.0. |
| Sucaryl sodium [1] | 0.5. |
| Saccharin sodium | 0.1. |
| Sorbitol | 22.0. |
| D & C Orange No. 4 | 0.01. |
| Essence peach blossom | 0.01. |
| Sodium benzoate | 0.2. |
| Distilled water, q.s. | 100.0. |

[1] Abbott's cyclamate sodium, i.e., sodium cyclohexanesulfamate.

The above ingredients are mixed as described below at room temperature and with stirring at a rate adjusted to minimize foaming. This technique was employed in the preparation of each of the compositions described in all of the examples herein unless otherwise noted.

The sodium novobiocin was dissolved in approximately 40–45% of the total volume of distilled water. Sufficient citric acid was added to precipitate the novobiocin as the amorphous acid and the pH adjusted to 3.0 with hydrochloric acid. Methyl cellulose then was added and then the flavoring, coloring and preservative agents were added and the volume corrected with the additional distilled water. The suspension was homogenized by passing through a Manton-Gaulin two-stage homogenizer using 1,500 p.s.i. (pounds per square inch) on the first valve and 1,000 p.s.i. on the second valve.

EXAMPLE 2

*Amorphous Novobiocin Stabilized With Cellulose Acetate Hydrogen Phthalate*

|   | Percent |
|---|---|
| Sodium novobiocin | Equivalent to 2.5 free acid. |
| Sodium hydroxide, N/1, q.s. | pH 8.0. |
| Cellulose acetate hydrogen phthalate | 0.1. |
| Hydrochloric acid, N/1, q.s. | pH 3.0. |
| Sucaryl sodium | 0.5. |
| Sorbitol, 70% solution | 22.0. |
| F D & C Red No. 2 | 0.01. |
| o-Phenylphenol | 0.00665. |
| Distilled water, q.s. | 100.0. |

The sodium novobiocin was dissolved in approximately 75% of the total volume of distilled water and then cellulose acetate hydrogen phthalate and sodium hydroxide added to adjust the pH to approximately 8.0. The pH was maintained at this level until the crystallization suppressant was completely dissolved. Hydrochloric acid then was added to precipitate the amorphous novobiocin and the pH readjusted to 3.0 with additional hydrochloric acid. The remainder of the ingredients were added, the volume adjusted with the remaining distilled water and the resulting mixture homogenized in a Manton-Gaulin two-stage homogenizer using 1,500 p.s.i. on the first valve and 1,000 p.s.i. on the second valve.

EXAMPLE 3

*Amorphous Novobiocin Stabilized with Kelgin XL*

|  | Percent |
|---|---|
| Sodium novobiocin | Equivalent to 2.5 free acid. |
| Kelgin XL | 0.1 |
| Sodium hydroxide solution, N/1, q.s | pH 8.0. |
| Citric acid, 5% solution, q.s | pH 3.0. |
| Saccharin sodium | 0.1. |
| Imitation wild cherry flavor | 0.01. |
| F D & C Red No. 2 | 0.01. |
| Sodium benzoate | 0.2. |
| Distilled water, q.s | 100.0. |

The sodium novobiocin was dissolved in 75% of the distilled water and Kelgin XL added thereto. Sodium hydroxide to maintain the pH at approximately 8.0 was added until all of the Kelgin XL had completely dissolved. Citric acid then was added to precipitate the amorphous novobiocin and thereafter the pH was adjusted to 3.0 with additional citric acid. The remainder of the ingredients were added and the volume brought up to 100% with the additional distilled water and the mixture then homogenized through a Manton-Gaulin two-stage homogenizer using 1,500 p.s.i. on the first valve and 1,000 p.s.i. on the second valve.

EXAMPLE 4

*Amorphous Novobiocin Stabilized with Kelgin LV*

|  | Percent |
|---|---|
| Sodium novobiocin | Equivalent to 2.5 free acid. |
| Kelgin LV | 2.0. |
| Sodium hydroxide, N/1, q.s | pH 8.0. |
| Citric acid, q.s | pH 3.0. |
| Sucaryl sodium | 0.5. |
| Saccharin sodium | 0.1. |
| Imitation lemon flavor | 0.01. |
| D & C Orange No. 4 | 0.01. |
| Sodium benzoate | 0.2. |
| Distilled water, q.s | 100.0. |

The process described in Example 3 was followed with the exception that Kelgin XL employed in Example 3 was replaced by Kelgin LV in the quantity specified above to form a stable suspension of the amorphous novobiocin.

EXAMPLE 5

*Amorphous Novobiocin Stabilized With Kelcoloid HV*

|  | Percent |
|---|---|
| Sodium novobiocin | Equivalent to 2.5 free acid. |
| Kelcoloid HV | 0.25. |
| Sodium hydroxide, N/1, q.s | pH 8.0. |
| Hydrochloric acid, N/1, q.s | pH 3.0. |
| Saccharin sodium | 0.1. |
| Imitation vanilla flavor | 0.01. |
| F D & C Green No. 1 | 0.01. |
| Distilled water, q.s | 100.00. |

The process described in Example 2 was employed with the exception that the cellulose acetate hydrogen phthalate employed in Example 2 was replaced by Kelcoloid HV in the quantity specified above to form a suspension of stable amorphous novobiocin.

EXAMPLE 6

*Amorphous Novobiocin Stabilized With Kelcoloid LV*

|  | Percent |
|---|---|
| Sodium novobiocin | Equivalent to 2.5 free acid. |
| Kelcoloid LV | 1.0. |
| Sodium hydroxide, N/1, q.s | pH 8.0. |
| Citric acid, 5% solution, q.s | pH 3.0. |
| Sorbitol, 70% solution | 22.0. |
| Imitation cherry flavor | 0.01. |
| F D & C Red No. 2 | 0.01. |
| o-Phenylphenol | 0.00665. |
| Distilled water, q.s | 100.0. |

The process described in Example 3 was employed with the exception that Kelgin XL employed in Example 3 was replaced by Kelcoloid LV in the quantity specified above to produce a suspension of stable amorphous novobiocin.

EXAMPLE 7

*Amorphous Novobiocin Stabilized With Casein*

|  | Percent |
|---|---|
| Sodium novobiocin | Equivalent to 2.5 free acid. |
| Casein | 0.25. |
| Sodium hydroxide, N/1, q.s | pH 8.0. |
| Hydrochloric acid, N/1, q.s | pH 3.0. |
| Syrup, 85% | 20.0. |
| F D & C Red No. 2 | 0.01. |
| Sodium benzoate | 0.2. |
| Distilled water, q.s | 100.0. |

The aqueous suspension of amorphous novobiocin was prepared by substantially the same method described in Example 3 with the exception that the Kelgin XL and the citric acid employed in Example 3 were replaced respectively by casein and hydrochloric acid, the casein being employed in the concentration given above.

EXAMPLE 8

*Amorphous Novobiocin Stabilized With Polyvinylpyrrolidone*

|  | Percent |
|---|---|
| Sodium novobiocin | Equivalent to 2.5 free acid. |
| Acetic acid, N/1, q.s | pH 3.0. |
| Polyvinylpyrrolidone, $K_{30}$ | 1.0. |
| Sucaryl sodium | 0.5. |
| Saccharin sodium | 0.1. |
| Sorbitol, 70% solution | 22.0. |
| D & C Orange No. 4 | 0.01. |
| Essence peach blossom | 0.01. |
| Sodium benzoate | 0.2. |
| Distilled water, q.s | 100.0. |

The aqueous suspension of amorphous novobiocin was prepared by substantially the same procedure described in Example 1 with the exception that the methyl cellulose and hydrochloric acid employed in Example 1 were replaced respectively by polyvinylpyrrolidone $K_{30}$ and acetic acid in the concentrations identified above.

EXAMPLE 9

*Amorphous Novobiocin Stabilized With Kelcoloid HV, and Suspension Stabilized With Sorbitol*

| | Percent |
|---|---|
| Sodium novobiocin | Equivalent to 2.5 free acid. |
| Kelcoloid HV | 0.5. |
| Potassium hydroxide, N/1, q.s | pH 8.0. |
| Hydrochloric acid, N/1, q.s | pH 3.0. |
| Sorbitol, 70% solution | 22.0. |
| Sucaryl sodium | 0.5. |
| Saccharin sodium | 0.1. |
| Essence peach blossom | 0.01. |
| F D & C Yellow No. 1 | 0.01. |
| Sodium benzoate | 0.2. |
| Distilled water, q.s | 100.0. |

The sodium novobiocin was dissolved in 50% of the distilled water, the Kelcoloid HV added and the pH adjusted to approximately 8.0 by the addition of potassium hydroxide solution. After all the Kelcoloid HV had dissolved, hydrochloric acid was added to precipitate amorphous novobiocin and the acidity of the composition was readjusted with additional quantities of hydrochloric acid to pH 3.0. Approximately 22% of sorbitol then was added as well as the remaining ingredients, the mixture thoroughly stirred and sufficient distilled water added to bring the volume to 100%. The suspension of amorphous novobiocin thus is stabilized against sedimentation by the suspending agent, sorbitol. The method of mixing and homogenization employed were the same as described in Example 1.

EXAMPLE 10

*Amorphous Novobiocin Stabilized With Kelgin XL, and Suspension Stabilized With Veegum*

| | Percent |
|---|---|
| Sodium novobiocin | Equivalent to 2.5 free acid. |
| Kelgin XL | 1.5. |
| Sodium hydroxide, N/1, q.s | pH 8.0. |
| Hydrochloric acid, N/1, q.s | pH 3.0. |
| Veegum (Magnesium aluminum silicate) | 0.5. |
| Syrup, 85% | 20.0. |
| F D & C Green No. 1 | 0.01. |
| Imitation lime | 0.01. |
| Sodium benzoate | 0.2. |
| Distilled water, q.s | 100.0. |

The sodium novobiocin was dissolved in 75% of the distilled water, Kelgin XL was added thereto and the pH adjusted to 8.0 by the addition of sodium hydroxide. The mixture was stirred at room temperature until all of the crystallization suppressant had dissolved. Sufficient hydrochloric acid was added to precipitate amorphous novobiocin and then additional quantities of hydrochloric acid were added to adjust the pH to 3.0. Magnesium aluminum silicate as a 5% gel was incorporated and the mixture thoroughly stirred to uniformly disperse and stabilize the suspension of amorphous novobiocin. The remainder of the ingredients and water to bring the volume to 100% were added and the suspension homogenized in a Manton-Gaulin two-stage homogenizer at a first valve pressure of 1,500 p.s.i. and a second valve pressure of 1,000 p.s.i.

EXAMPLE 11

*Amorphous Novobiocin Stabilized With Methyl Cellulose and Containing Penicillin*

| | Percent |
|---|---|
| Sodium novobiocin | Equivalent to 2.5 free acid. |
| Methyl cellulose, 1500 cps | 0.75. |
| Hydrochloric acid, q.s | pH 3.0. |
| "Benapen" (N-benzylphenylethylamine salt of penicillin) | 2.25. |
| Sucaryl sodium | 0.5. |
| Saccharin sodium | 0.5. |
| Sorbitol, 70% solution | 22.0. |
| Imitation lemon | 0.01. |
| D & C Orange No. 4 | 0.01. |
| o-Phenylphenol | 0.00665. |
| Distilled water, q.s | 100.0. |

The aqueous suspension of amorphous novobiocin was prepared by substantially the same method described in Example 1 with the exception that Benapen was added along with the remaining flavoring, coloring and preservative ingredients before the volume was brought to 100% by addition of the remaining distilled water. The suspension was homogenized in a Manton-Gaulin two-stage homogenizer using 1,500 p.s.i. on the first valve and 1,000 p.s.i. on the second valve.

While the invention has been described with reference to compositions comprising amorphous novobiocin, a crystallization suppressant and certain other specific ingredients, it is to be understood that the invention is not limited to the particular ingredients named in the examples as variations and modifications can be made as described in the preceding portions of the disclosure and that the invention is limited solely by the scope of the appended claims.

We claim:

1. A method for the preparation of an aqueous suspension of amorphous novobiocin wherein said novobiocin is retained in its substantially amorphous form which comprises dissolving an alkali metal salt of novobiocin in water, treating it with an acid selected from the group consisting of mineral acids and organic acids to form the amorphous novobiocin and adding a crystallization suppressant selected from the group consisting of methyl cellulose and polyvinylpyrrolidone and adjusting the pH to about 3.

2. A method for the preparation of an aqueous suspension of amorphous novobiocin wherein said novobiocin is retained in its substantially amorphous form which comprises dissolving an alkali metal salt of novobiocin and a crystallization suppressant selected from the group consisting of casein, cellulose acetate hydrogen phthalate, propylene glycol derivative of alginic acid and alkali metal salts of algenic acid in water, converting the alkali metal salt of novobiocin to amorphous novobiocin with an acid selected from the group consisting of mineral acids and organic acids and adjusting the pH to about 3.

3. An aqueous suspension of amorphous novobiocin obtained by the process of claim 1.

4. An aqueous suspension of amorphous novobiocin obtained by the process of claim 2.

References Cited in the file of this patent

UNITED STATES PATENTS

| 2,637,679 | Gaunt et al. | May 5, 1953 |
| 2,671,750 | Macek | Mar. 9, 1954 |
| 2,725,336 | Sumner et al. | Nov. 29, 1955 |
| 2,739,098 | Conn et al. | Mar. 20, 1956 |
| 2,745,785 | Bruce et al. | May 15, 1956 |
| 2,791,609 | Kaplan | May 7, 1957 |
| 2,795,528 | Buckwalter et al. | June 11, 1957 |

(Other references on following page)

UNITED STATES PATENTS

| | | |
|---|---|---|
| 2,895,952 | Kaczka | July 21, 1959 |
| 2,923,705 | Chaiet | Feb. 2, 1960 |
| 2,951,014 | Garman | Aug. 30, 1960 |
| 2,963,403 | Hiestand | Dec. 6, 1960 |
| 2,966,442 | Elias et al. | Dec. 27, 1960 |

OTHER REFERENCES

Mullins, J. D., and Macek, T. J.: "Some Pharmaceutical Properties of Nocobiocin," Journal American Pharmaceutical Association (Sci. Ed.), vol. 49, pp. 245–248, April 1960 (presented to the Scientific Section, A. Ph. A. Cincinnati meeting, August 1959).

Dispensatory of the U.S.A., 25th ed., J. B. Lippincott Co., Phila., 1955, pp. 855, 1251, 1717, 1815.

Wilkinson et al.: Proc. 40th Mid-Year Meeting, Chem. Specialties Manufacturers' Assn., May 1954, pp. 25–29, particularly p. 26, left column.